Patented Aug. 15, 1939

2,169,240

UNITED STATES PATENT OFFICE 2,169,240

PHENOL COMPOSITION

Sheldon B. Heath and Merlin O. Keller, Midland, Mich., assignors to The Dow Chemical Company, Midland, Mich., a corporation of Michigan No Drawing. Application October 5, 1937, Serial No. 167,411

11 Claims. (Cl. 167—31)

This invention concerns compositions comprising mixtures of starch and solid phenol compounds in which the starch is dispersed in and through the phenol compound and held thereby as in solid suspension.

Phenols generally have been found to be of value as microbicidal, fungicidal, and insecticidal materials and as such are frequently employed as dusts, as aqueous suspensions, as solutions in organic solvents, and as solutes in the oily phase of oil-water emulsion compositions, etc. In order that these compounds may function with maximum utility for such purposes and in such compositions, it is desirable that they be obtainable in finely divided form. For example, when applied in water suspension or as dusts, the particle size of the phenol compound determines the coverage obtainable with any given amount thereof and in many instances the degree of effectiveness resulting from such application. Oil-water emulsions containing a solid phenol as a toxic ingredient are frequently produced by the tank-mix method, that is, the water, oil, solid phenol compound, and emulsifier are mixed together immediately prior to the use of the composition. Solutions of solid phenols in various organic solvents are preferably prepared by stirring the phenol compound with a solvent. In preparing solutions, suspensions, and emulsions as above, it is preferable that the solid phenol compound be employed in such a state of subdivision that it be quickly and completely dispersed in the water, oil, or solvent without the necessity of applying heat thereto.

Efforts to provide solid phenol compounds in finely divided form as by grinding, etc., have proven impractical, due to the tendency of such compounds to coalesce into balls which pack together. Furthermore, such phenols when ground cannot be conveniently stored in finely divided form since the particles tend to grow together, sublime, or otherwise to reassociate, giving rise to a product containing agglomerates, which product is unsuited for use in insecticidal or microbicidal preparations where fineness of particle size is of paramount importance.

An object of this invention is to provide compositions comprising solid phenol compounds which on contact with water will disintegrate to give fine dispersions of the free phenol. A further object of the invention is to provide compositions comprising solid phenol compounds which may be roughly comminuted and thereafter stored indefinitely without undergoing change in particle size or other chemical or physical alteration. A further object is to provide substantially anhydrous compositions comprising solid phenol compounds adapted to be used in the preparation of microbicidal and/or insecticidal spray compositions. An additional object is to provide a method for the preparation of such compositions. Other objects of the invention will become apparent from the following specification.

I have discovered that the product obtained by mixing starch with a fused phenol compound, and particularly a compound having a melting point in excess of 50° C., possesses the characteristic of rapidly disintegrating on contact with water or aqueous solutions to give a suspension of minute particles of the solid phenol. This substantially anhydrous fusion mixture does not readily absorb moisture from the air and is not appreciably affected by exposure to air and light or by prolonged storage. I have further found that such solid dispersions are well adapted for use in the preparation of microbicidal and insecticidal compositions, e. g. aqueous suspensions of solid phenol compounds, dusts comprising such compounds in finely divided form, and particularly tank-mix oil-water emulsions.

In preparing my new compositions, starch is stirred into a molten phenol compound, the resulting slurry solidified by cooling below the fusion temperature of the mixture to form a hard brittle cake, and the cake roughly comminuted by crushing or grinding. The state of division of the substantially anhydrous product, resulting from such comminution is not critical, although a material having an average particle size of from 5 to 60 screen mesh is to be preferred. The amount of starch stirred into the molten phenol compound may vary from 5 to 100 parts per 100 parts of the phenol, the preferred amount thereof depending upon the purpose for which the cooled and ground material is to be employed. When wet with water and agitated, the mechanically held starch in the coarsely ground fusion mixture rapidly swells and disintegrates to form a non-sticking slurry of starch particles and an aqueous dispersion of the solid phenol compound in extremely finely divided form. The dispersed phenol compound is in the form of fine crystal segments, some of which approach a size of 40 microns, the majority being about 2 microns in diameter. The percentage of 2-micron particles increases as increasing amounts of starch are employed in the fusion mixture and approaches 100 per cent as the proportion of starch employed therein approaches 50 per cent by weight of the mixture.

Wetting agents such as sulphite process waste liquor products, spruce extract, sulphonated oils and fatty acids, sulphated alcohols, blood albumen, phenol sulphonic acids, etc., may be included in the mixture, the presence of such materials therein accelerating the tendency of the product to become wetted upon contact with water and to disintegrate. These wetting and dispersing agents can, if desired, be added to the fusion mixture in the molten state although I generally prefer to make such addition to the cooled and roughly ground product by mechanical mixing.

A representative dry fusion mixture found particularly useful for insecticidal purposes has the following composition.

| | Parts by weight |
|---|---|
| 2,4-dinitro-6-cyclohexyl phenol | 54 |
| Starch | 46 |
| Dry sulphite waste liquor (Goulac) | 46 |

In preparing the above, the starch was slowly added with stirring to the molten 2,4-dinitro-6-cyclohexyl phenol at temperatures gradually increasing from 100° to 120° C. The resulting mixture was a thick paste which was thereafter cooled to solidify the same and the solid cake ground to an average particle size of 20 screen mesh. This product was found to disintegrate rapidly when stirred with water to give a nonsticking suspension of swelled starch particles, and a dispersion of 2,4-dinitro-6-cyclohexyl phenol in water having an average particle size of approximately 2 microns. The roughly ground material prepared above was mechanically mixed with dried sulphite waste liquor, i. e. Goulac, to facilitate wetting thereof with water. 0.67 gram of the mixture so obtained was found to disperse in 100 milliliters of distilled water at 25° C. in approximately 2 minutes. The dispersed product was free of agglomerates of 2,4-dinitro-6-cyclohexyl phenol.

A water-oil emulsion prepared by mixing 1.9 pounds of the above described product containing the wetting agent, 0.6 pound of bentonite, 15 gallons of water, and 16.6 pounds of a light lubricating oil, and thereafter rapidly agitating such mixture for several minutes and diluting to 100 gallons with water, was adapted to be employed as a dormant spray for the control of insect pests.

Other compositions obtained by mixing starch with a fused phenol compound were as follows:

| | Parts by weight |
|---|---|
| Ortho-phenylphenol | 15 |
| Starch | 14 |
| 4-tertiary-butyl phenol | 15 |
| Starch | 14 |
| 2,4,6-trichlorophenol | 15 |
| Starch | 14 |
| 2,4-dinitro-6-methyl phenol | 15 |
| Starch | 14 |

In each of the above compositions the starch was stirred into the molten phenol compound, and the mixture solidified by cooling below the fusion temperature of the mixture and thereafter roughly comminuted. Portions of such roughly ground dry-mix compositions were agitated with water to obtain suspensions of the several phenols in finely divided form. These mixtures were adapted to be applied as microbicidal, germicidal, or insecticidal sprays depending upon the particular characteristics of the phenol compound employed. The starch in these compositions reduced the tendency for particles of the phenol contained therein to be dusted from surfaces sprayed or otherwise treated therewith following evaporation of the aqueous medium.

Among other phenols which can be similarly compounded with starch to obtain compositions which dissociate on contact with water are pentachlorophenol, 2,4-dinitro-6-phenylphenol, 2,4,5,6-tetrachlorophenol, 2,4,6-tribromophenol, 1,2-dihydroxy phenol, 4-n-hexyl resorcinol, and other solid di- and tri-hydroxy phenols and such substitution products thereof as are solid.

Other modes of applying the principle of our invention may be employed instead of those explained, change being made as regards the products and methods herein disclosed, provided the compositions or steps stated by any of the following claims or the equivalent of such stated compositions or steps be employed.

We therefore particularly point out and distinctly claim as our invention:

1. A roughly comminuted composition of matter comprising as major constituents a solid phenol compound and starch, the latter being in solid suspension in said phenol, which composition is capable of disintegrating on contact with water to form a suspension comprising the solid phenol compound in finely divided form.

2. A roughly comminuted composition of matter comprising a solid phenol compound and from 5 to 100 per cent by weight thereof of starch in solid suspension in said phenol, which composition is capable of disintegrating on contact with water to form a suspension comprising the phenol compound in finely divided form.

3. A roughly comminuted substantially anhydrous mixture of a solid phenol compound and from 5 to 100 per cent by weight thereof of starch, in which the starch is in solid suspension in the phenol compound.

4. A composition comprising a solid suspension of starch in a solid phenol compound and prepared by stirring starch into said phenol at temperatures above the melting point of the latter, thereafter cooling the mixture to solidify the same, and roughly comminuting the resulting solid cake.

5. A roughly comminuted composition of matter comprising as major constituents a phenol compound melting above 50° C. and starch, the latter being in solid suspension in said phenol, which composition is capable of disintegrating on contact with water to form a suspension comprising a solid phenol compound in finely divided form.

6. A roughly comminuted composition of matter consisting of 100 parts of a phenol compound melting above 50° C., from 5 to 100 parts by weight of starch in solid suspension in said phenol, and a wetting agent.

7. A roughly comminuted substantially anhydrous mixture of starch and 2,4-dinitro-6-cyclohexyl phenol, in which the starch is in solid suspension in the 2,4-dinitro-6-cyclohexyl phenol.

8. A roughly comminuted substantially anhydrous mixture of 100 parts of 2,4-dinitro-6-cyclohexyl phenol and from 5 to 100 parts by weight of starch, in which the starch is in solid suspension in the 2,4-dinitro-6-cyclohexyl phenol.

9. A composition comprising a solid suspension of starch in 2,4-dinitro-cyclohexyl phenol and prepared by stirring starch into molten 2,4-dinitro-6-cyclohexyl phenol, thereafter cooling the mixture to solidify the same, and roughly comminuting the resulting solid cake.

10. A roughly comminuted substantially anhydrous mixture of 100 parts of 2.4-dinitro-6-methyl phenol and from 5 to 100 parts by weight of starch in which the starch is in solid suspension in the 2.4-dinitro-6-methyl phenol.

11. A composition comprising a solid suspension of starch in 2.4-dinitro-6-methyl phenol and prepared by stirring starch into molten 2.4-dinitro-6-methyl phenol, thereafter cooling the mixture to solidify the same, and roughly comminuting the resulting solid cake.

SHELDON B. HEATH.
MERLIN O. KELLER.